United States Patent [19]

Jarrett

[11] 4,254,935

[45] Mar. 10, 1981

[54] SOLENOID CONSTRUCTION

[75] Inventor: Boaz A. Jarrett, London, England

[73] Assignee: Lucas Industries Limited, Birmingham, England

[21] Appl. No.: 69,792

[22] Filed: Aug. 27, 1979

[30] Foreign Application Priority Data

Jul. 6, 1979 [GB] United Kingdom ............... 23687/79

[51] Int. Cl.$^3$ ............................................. F16K 31/06

[52] U.S. Cl. .................................... 251/137; 251/129; 251/139; 251/141

[58] Field of Search ................ 251/141, 129, 137, 139

[56] References Cited

U.S. PATENT DOCUMENTS 3,625,477 12/1971 Vogel .............................. 251/141 X

*Primary Examiner*—Arnold Rosenthal

[57] ABSTRACT

A solenoid valve including an armature having axially spaced circumferential grooves and magnetizable discs extending into the grooves. The discs are formed in at least two parts to permit assembly of the discs into the grooves and are offset in the grooves. A winding is provided which when energized polarizes the discs so that adjacent discs have opposite magnetic polarity.

3 Claims, 2 Drawing Figures

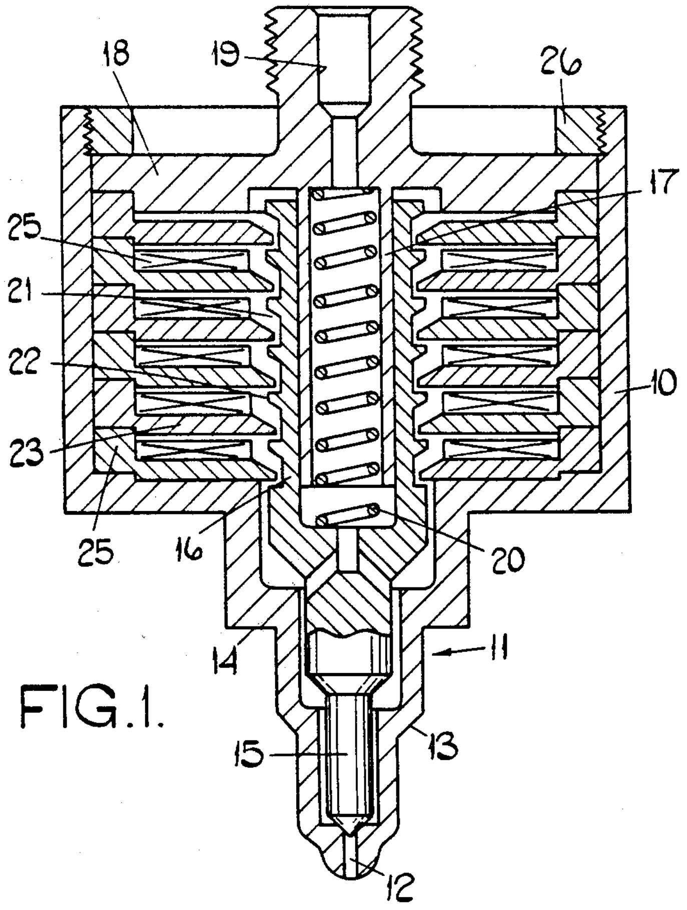
FIG.1.
FIG.2.
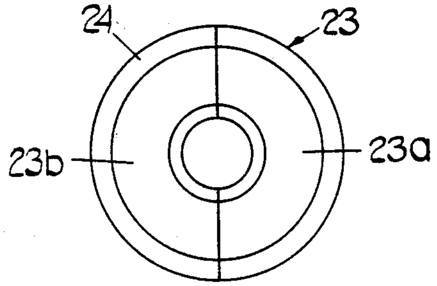

SOLENOID CONSTRUCTION

This invention relates to a solenoid valve of the kind comprising a cylindrical armature formed from magnetisable material and having a plurality of axially spaced annular grooves formed in its outer peripheral surface, the grooves lying in planes respectively perpendicular to the axis of movement of the armature, an electrical winding comprising a plurality of annular disc shaped winding portions surrounding the armature, each winding portion lying between a plurality of annular discs formed from magnetisable material and surrounding the armature, adjacent discs being in contact with each other at their outer edge portions, there being as many annular discs as there are grooves on the armature, the winding portions being arranged so that in use when electric current flows therethrough adjacent discs will assume opposite magnetic polarity, the magnetic flux effecting movement of the armature, and a valve closure member movable by the armature.

An example of such a valve is described and claimed in the Specification of British Pat. No. 1,305,437. In the valve described in this specification the inner faces of the discs are radially spaced from the peripheral surface of the armature with the result that when the windings are energised the ribs on the armature and which are defined by the grooves, are moved into alignment with the inner faces of the discs. The force which is applied to the armature is therefore limited. An increased force can be generated for a given number of ampere turns if the air gaps between the discs and the ribs can be arranged to reduce as the armature moves. This requires that the inner edges of the discs should extend into the aforesaid grooves.

The object of the present invention is to provide a solenoid valve of the kind specified in a simple and convenient form.

According to the invention in a solenoid valve of the kind specified each of said discs is divided into at least two parts whereby the discs can be assembled about the armature with the inner edges of the parts of the discs extending into the respective grooves, the thickness of the inner edges of the discs being chosen in relation to the width of the grooves so that in the de-energised condition of the winding the discs are off set in the axial direction in relation to the slots. An example of a solenoid valve in accordance with the invention will now be described with reference to the accompanying drawing in which FIG. 1 is a sectional side elevation of the solenoid valve, and FIG. 2 is a plan view of a reduced scale, of part of the valve seen in FIG. 1. Referring to the drawings the valve comprises a main housing 10 which is of cup shaped form and formed integrally with the base wall of the housing 10 is an axially extending extension 11. The extension 11 is of stepped form the narrower end being rounded in form and defining an outlet orifice 12. The extension also defines an inclined surface 13 and a step 14. The inclined surface 13 in use, locates against a complementary surface defined in a bore extending through the cylinder head of a compression ignition engine and the outlet orifice 12 serves to direct fuel into a combustion chamber of the engine.

Within the extension there is formed a stepped bore from the narrower end of which the outlet orifice 12 extends. Located within the bore is a valve member 15. The end of the valve member 15 remote from the housing 10 is of conical form for engagement with a seating defined about the outlet orifice.

The valve member 15 is integrally formed with a hollow cylindrical armature 16 and the armature is slidably mounted about a hollow cylindrical guide 17 which is integrally formed with a closure member 18 which is positioned in the open end of the housing 10. The bore defined by the guide 17 communicates with a fuel inlet 19 and located within the bore is a coiled compression spring 20 which acts on the valve member to urge the valve member into contact with the seating, passages are formed in the valve member so that fuel can flow when the valve member is in the open position, from the inlet 19 to the outlet orifice 12.

Formed in the outer peripheral surface of the armature 16 are a plurality of axially spaced annular grooves 21 and the grooves 21 define between them ribs 22. The outer surfaces of the ribs are of cylindrical form whilst the side faces of the ribs which are remote from the valve member 15 are perpendicular to the axis of the valve member. These surfaces will hereinafter be called the attraction surfaces of the ribs. A further attraction surface is defined by the end wall of the groove 21 which is nearest to the valve member 15. The other side surfaces of the ribs 22 are inclined so that the thickness of each rib diminishes as the distance from the axis increases. An inclined surface is also defined by the groove 21 furthest from the valve member 15.

Extending into the grooves 21 are discs 23 and as shown in FIG. 2, each disc is divided diametrically into two parts ***23a*, *23b*. The outer edge portions 24 of each disc have the form of flanges of increased thickness as compared with the remaining portions of the discs and also each flange portion defines a recess on one side of the disc so that when the discs are inserted in the housing, the recess on one disc receives the flange on the adjacent disc. The inner surface of the base wall of the housing 10 is provided with a step which locates in the recess of the adjacent disc and the end closure 18** is similarly provided with a recess to receive the flange portion of the adjacent disc.

The inner edge portions of the discs on one side define surfaces which are disposed parallel to the aforesaid attraction faces and on the other side define inclined faces so that the thickness of the inner edge portions of the discs decreases towards the armature.

Positioned between adjacent pairs of discs are annular winding portions 25 which together constitute a solenoid. The winding portions may be connected in series or parallel but whichever method of connection is employed it is arranged that the direction of current flow in adjacent winding portions is in the opposite direction. As a result when electric current is supplied to the winding adjacent discs 23 will assume opposite magnetic polarity. As shown the gaps between the discs and the aforesaid attraction faces are smaller than the gaps between the aforesaid inclined surfaces of the ribs and the discs and as a result an attraction force will be developed to effect movement of the armature and the valve member 15 against the action of the spring 20. As movement occurs the size of the air gaps decreases so that the force acting on the armature will increase as movement of the armature takes place. The extent of movement of the armature may be limited by contact of the ribs with the discs alternatively, the closure member 18 may be arranged to define a stop surface for the armature.

The discs and winding portions may be assembled about the armature and the connections effected to the winding portions exterior of the housing and then the assembly can be inserted into the housing through the open end thereof. The inner surface of the open end portion of the housing is provided with a screw thread to receive a retaining ring 26 which when tightened, maintains the closure member and the discs in assembled relationship. The connections between the winding portions may be effected by way of registering slots (not shown) which may be formed in the flange portions 24 of the discs. Any suitable form of connector may be provided, for example on the housing or the closure member 18.

I claim:

1. A solenoid valve comprising a cylindrical armature formed from magnetizable material and having a plurality of axially spaced annular grooves formed in its outer peripheral surface, the grooves lying in planes respectively perpendicular to the axis of movement of the armature, an electrical winding comprising a plurality of annular disc shaped winding portions surrounding the armature, each winding portion lying between an adjacent pair of a plurality of annular discs formed from magnetizable material and surrounding the armature, adjacent discs being in contact with each other at their outer edge portions, there being as many annular discs as there are grooves on the armature, the winding portions being arranged so that in use when electric current flows therethrough adjacent discs will assume opposite magnetic polarity, the magnetic flux effecting movement of the armature, each of said discs being divided into at least two parts whereby the discs can be assembled about the armature with the inner edges of the discs extending into the respective grooves the thickness of the inner edges of the discs being chosen in relation to the width of the grooves so that in the de-energised condition of the winding the discs are offset in the axial direction in relation to the grooves and a valve closure member movable by the armature.

2. A solenoid valve according to claim 1 in which the side faces of the discs and the side faces of the grooves which are nearer to each other in the de-energised condition of the winding are perpendicular to the axis of movement of the armature.

3. A solenoid valve according to claim 2 in which the other side faces of the discs and grooves are inclined to the axis of movement of the armature so that the thickness of the discs decreases as the distance to the axis of movement of the armature decreases.

* * * * *